Patented Nov. 10, 1931

1,831,164

UNITED STATES PATENT OFFICE

CHARLES C. DAWE, OF DENVER, COLORADO

FATTENING FEED

No Drawing.      Application filed April 21, 1930. Serial No. 446,190.

My invention relates to a process of producing a fatty ingredient for fattening feeds for poultry and animals. The principal object of the invention is to produce a granular or powdered fattening feed without grinding.

The product of the present process is very desirable as a fattening ingredient for a food to be used in forced feeding for poultry and animals for the market. My product produces firm, fine fat under the skin and not in the intestines, thereby producing highest grade fowls, etc. which bring the highest prices on the market.

The following description contains novel steps and arrangements of steps to produce said fattening material. It is to be understood that changes may be made in the process without departing from the spirit of the invention, and that this specification only describes one embodiment of the invention.

My process consists first in melting a quantity of animal fats, preferably an animal fat that congeals at atmospheric temperatures such as tallow or what is known in the trade as "oleo stock". This molten material is mixed with heated water and lime, preferably at a temperature of 180° Fahrenheit, and the mixture is agitated. The mixture is then homogenized; i. e., the fat globules are broken up under high pressure, such as 6500 pounds, to finely divided particles. Any other suitable method or means may of course be used to break up the fat globules. After that the mixture is fed into a vat of cold water of a temperature less than 60° Fahrenheit.

The water in the mixture loses its identity in the water in the vat, and the molten fat quickly congeals in the cold water, but since the lime is present, the particles of congealed fat are coated with the lime.

The water is then drawn off. The solids are then collected and heated slightly by any suitable means to expel remaining moisture from around the solids. The heat is sufficiently low that it does not melt the fats.

Proportions of the mixture which have been found to produce satisfactory results are as follows:

|  | Per cent |
|---|---|
| Lime | 20 |
| Molten animal fat | 40 |
| Hot water | 40 |
|  | 100 |

Hydrated lime has been found to be satisfactory in said mixture. The lime ingredient serves several purposes. First, it acts as a preservative for the fat. Second, it separates the particles of fat, so as to prevent the fat from congealing in large lumps. Third, it prevents the product from having moist or sticky surfaces, whereby the product is kept in powdered or granular form while at atmospheric temperatures.

The product of my process consists of externally dry, lime-coated, granular particles of congealed animal fat. Of course, some of the lime may be inside the particles, but from an examination of the product it appears that most of the lime is on the surface. The lime, moreover, causes the fat to congeal in small particles and not to become attached to adjacent particles.

The lime broadly speaking is a non-metallic mineral carrier for the fat. Quicklime may also be used.

My product is a very desirable fattening ingredient for poultry and animal feed, and is produced in granular or powdered form without grinding.

What I claim and desire to secure by Letters Patent is:

1. An animal fattening material consisting of lime-coated, granular particles of congealed animal fat.

2. An animal fattening material consisting of externally dry, lime-coated particles of congealed animal fat.

3. An animal fattening material consisting of congealed animal fat coated with lime.

4. The process of producing a fattening material for animal and poultry feed, consisting in mixing molten animal fat, that is adapted to congeal at atmospheric temperatures, with hot water and lime, breaking up the fat globules into finely divided particles, and introducing the mixture into cold water, whereby to produce lime-coated particles of congealed animal fat.

5. The process of producing a fattening material for animal and poultry feed, consisting in mixing molten animal fat, that is adapted to congeal at atmospheric temperatures, with lime, breaking up the fat globules into finely divided particles, introducing the mixture into cold water, and separating the solids from the liquid.

6. The process of producing a fattening material for animal and poultry feed, consisting in mixing molten animal fat, that is adapted to congeal at atmospheric temperatures, with lime, introducing the mixture into cold water, and separating the solids from the liquid.

7. The process of producing a fattening material for animal and poultry feed, consisting in mixing molten animal fat, that is adapted to congeal at atmospheric temperatures, with hot water and lime in about the proportions of molten fat 40%, hot water 40%, and lime 20%, breaking up the globules of fat, introducing the mixture into cold water, and separating the solids from the liquid.

In testimony whereof I hereunto affix my signature.

CHARLES C. DAWE.